United States Patent [19]
Schultz

[11] Patent Number: 5,996,476
[45] Date of Patent: Dec. 7, 1999

[54] DEVICE FOR PRESSING, IMPRINTING AND COOKING FLAT BREAD PRODUCTS

[76] Inventor: George A. Schultz, 176 Ohio St., New Braunfels, Tex. 78130

[21] Appl. No.: 08/682,851

[22] Filed: Jul. 9, 1996

[51] Int. Cl.⁶ .................................................. A21B 1/42
[52] U.S. Cl. ........................ 99/349; 99/353; 99/373; 99/376; 99/423; 99/443 C; 425/385; 425/394; 425/403.1; 425/404
[58] Field of Search .......................... 99/349, 353, 372, 99/373, 376, 378, 380, 423, 443 C; 426/512; 425/385, 396, 403.1, DIG. 37, 394, DIG. 201, DIG. 10, 404; 249/104, 78; 198/359

[56] References Cited

U.S. PATENT DOCUMENTS

| | | |
|---|---|---|
| 701,662 | 3/1902 | Zaiser . |
| 2,358,452 | 9/1944 | Garstang . |
| 2,571,891 | 10/1951 | Kassan et al. ............................. 99/373 |
| 2,719,903 | 10/1955 | Oertli ........................................ 99/372 |
| 2,791,960 | 5/1957 | Pietropinto . |
| 2,859,713 | 11/1958 | Noel ......................................... 99/372 |
| 3,029,676 | 4/1962 | Rabinow . |
| 3,527,173 | 9/1970 | Mullvain .............................. 425/403.1 |
| 4,150,609 | 4/1979 | McClean .................................. 99/372 |
| 4,290,349 | 9/1981 | Fiorenza . |
| 4,364,308 | 12/1982 | John et al. ................................. 99/372 |
| 4,508,025 | 4/1985 | Schultz . |
| 4,569,851 | 2/1986 | Schultz . |
| 4,656,927 | 4/1987 | Mosby et al. . |
| 4,664,025 | 5/1987 | Martinez . |
| 4,683,813 | 8/1987 | Schultz . |
| 4,724,755 | 2/1988 | Escamilla . |
| 4,751,876 | 6/1988 | Escamilla .............................. 426/512 |
| 4,838,153 | 6/1989 | Escamilla et al. . |
| 5,016,528 | 5/1991 | Chen ....................................... 99/373 |
| 5,392,696 | 2/1995 | Navarno et al. ......................... 99/423 |
| 5,481,963 | 1/1996 | Sesona et al. . |

*Primary Examiner*—James P. Mackey
*Attorney, Agent, or Firm*—George R. Schultz; Akin, Gump, Strauss, Hauer & Feld, L.L.P.

[57] ABSTRACT

An imprinting press and cooking apparatus for a dough product includes an imprinting station with respective opposed lower press and upper imprinting plates and rotating plate or endless belt conveyors adjacent the imprinting station for moving the dough product which has been pressed and imprinted through a cooking or baking phase. Heat sources are disposed adjacent the imprinting station and the conveyors for preheating the dough product for release from the printing station and for cooking the dough product, respectively. A pressure air slide is disposed between conveyor stages for transferring the dough product from one conveyor stage to another. Pressure air is supplied to the air slide through a conduit and into a chamber for flow through a perforated plate which supports the dough product for movement along the slide.

17 Claims, 5 Drawing Sheets

DEVICE FOR PRESSING, IMPRINTING AND COOKING FLAT BREAD PRODUCTS

FIELD OF THE INVENTION

The present invention relates to devices for pressing, imprinting and cooking flat bread products. Specifically, the device can imprint an image, shape or word directly onto tortillas, pizza shells, chapati bread or pita bread.

BACKGROUND OF THE INVENTION

Many Mexican restaurants are proud of their names and would imprint that name on the tortillas they serve if they could. Unfortunately, there has never been a device which could imprint the name onto the surface of such flat bread products.

The imprinting of bakery products typically involves the utilization of a mold in which the bakery product batter dough is poured and cooked. The batter conforms to the mold during cooking and keeps its shape thereafter. For example, U.S. Pat. No. 2,358,452 to Garstang shows an circular design for a waffle iron allows designs to be made in a waffle. The waffle iron has a recessed patterned surface on the bottom and a top surface bearing a pattern or design to be cooked into the waffle. Both the top and the bottom plates are electrically heated. In operation, waffle batter is poured into the iron, the iron is then closed and activated. The waffle batter is formed and cooked at the same time and then removed from the iron.

A second example of the prior art is found in U.S. Pat. No. 2,791,960 to Pietropinto, which discloses a device for making cookies and edible articles such as waffles or wheat cakes. This device is formed by a heated upper plate and an adjustable lower plate. The upper plates bears the design to be imprinted on the waffle. The lower plate or "dough receiving pocket" is an adjustable cavity which allows the thickness of the waffle to be varied. Both the upper and lower plates are hinged together and electrically heated. In operation, waffle dough or cookie dough is placed between the plates, which are then closed, forming and cooking the batter or dough placed between the plates.

The present invention deals with pressing, imprinting and cooking tortilla dough, pizza dough or pita bread dough, all essentially flat bread products. Dough for such flat bread products has distinctively different characteristics from waffle batter or cookie dough. Cooking a flat bread product generally, requires two steps. The first step involves pressing a piece of dough into a flat disk on a set of heated plates. The second step requires that the flat disk of dough be placed on a grill to complete cooking on both sides. Additionally, during the cooking process, the bread dough rises, creating patterns in the surface of the bread product as well as air pockets and other irregularities. The rising of the dough during cooking makes a single step of pressing, imprinting and cooking impossible.

There are several examples of presses and baking machines for flat bread products in the prior art; however, none of these machines imprint a design on the bread products. The closest prior art was invented by the present applicant. The first was U.S. Pat. No. 4,508,025 disclosing a tortilla press and oven unit. This machine presses and forms tortillas and then delivers them to a plurality of roasting oven disks. The tortilla is initially pressed between a set of heated press plates, then it is transferred to a first oven disk to partially cook the tortilla. It is then transferred to a second and third disk, being flipped over in between, to complete cooking of the bread product. The device is complex, and does not have the ability to imprint the bread products as they are pressed and cooked. Additionally, the slide used to flip the bread product often causes the bread product to stick and jam the machine.

A second example is U.S. Pat. No. 4,683,813 to the applicant. In this invention an improved synchronized press and method for forming bakery products is disclosed. A single heated plate is pressed downward against a heated parallel rotating disk and synchronized to match the motion of the rotating disk. This movement presses a dough ball into a flat bread product which is then cooked on several rotating disks. No method of printing is disclosed. Also, the method disclosed to flip the tortilla and transfer it from one disk to another is the same as that used in other prior art patents, such as U.S. Pat. No. 4,508,025 and so it has the same sticking problems.

A need exists for a press which can imprint a design on a flat bread product using at least two separate steps, imprinting and cooking. Moreover, a need exists for an imprinting press in combination with rotating cooking disks to aid in the convenience and compactness of a cooking unit. Finally, a need exists for an improvement to the prior art to aid in the transfer of a tortilla from one rotating cooking disk to the next.

SUMMARY OF THE INVENTION

Accordingly, the present invention provides an imprinting press and cooking device whereby a bakery product such as a tortilla may be evenly pressed and imprinted in one step and cooked in a second step on a set of rotating disks which automatically turn and cook the bread product through the use of an air slide. An air pressure source for the air slide is also provided which forces ambient air through a conduit and into the air slide. The air slide is formed in a shape of a flat curved duct being perforated on one side. A mechanical driving system is provided whereby the disks are rotated in a simple, economical and dependable fashion. A heating system for the disks and the imprinting press is also provided. In a preferred embodiment, the imprinting press is electrically heated through the use of two heating elements. The rotating disks are heated through the use of gas burners, all of which are controlled through a central on/off switch.

The present invention also provides a method for forming imprinted flat bread products. The method comprises the steps of depositing a portion of bakery dough into the press, pressing and imprinting the dough product and then removing the dough product to a conveyor to be cooked, one side at a time.

BRIEF DESCRIPTION OF THE DRAWINGS

For a more complete understanding of the present invention, and for further details and advantages thereof, reference is now made to the following Detailed Description taken in conjunction with the accompanying drawings, in which.

DETAILED DESCRIPTION OF THE INVENTION

Figure 1:
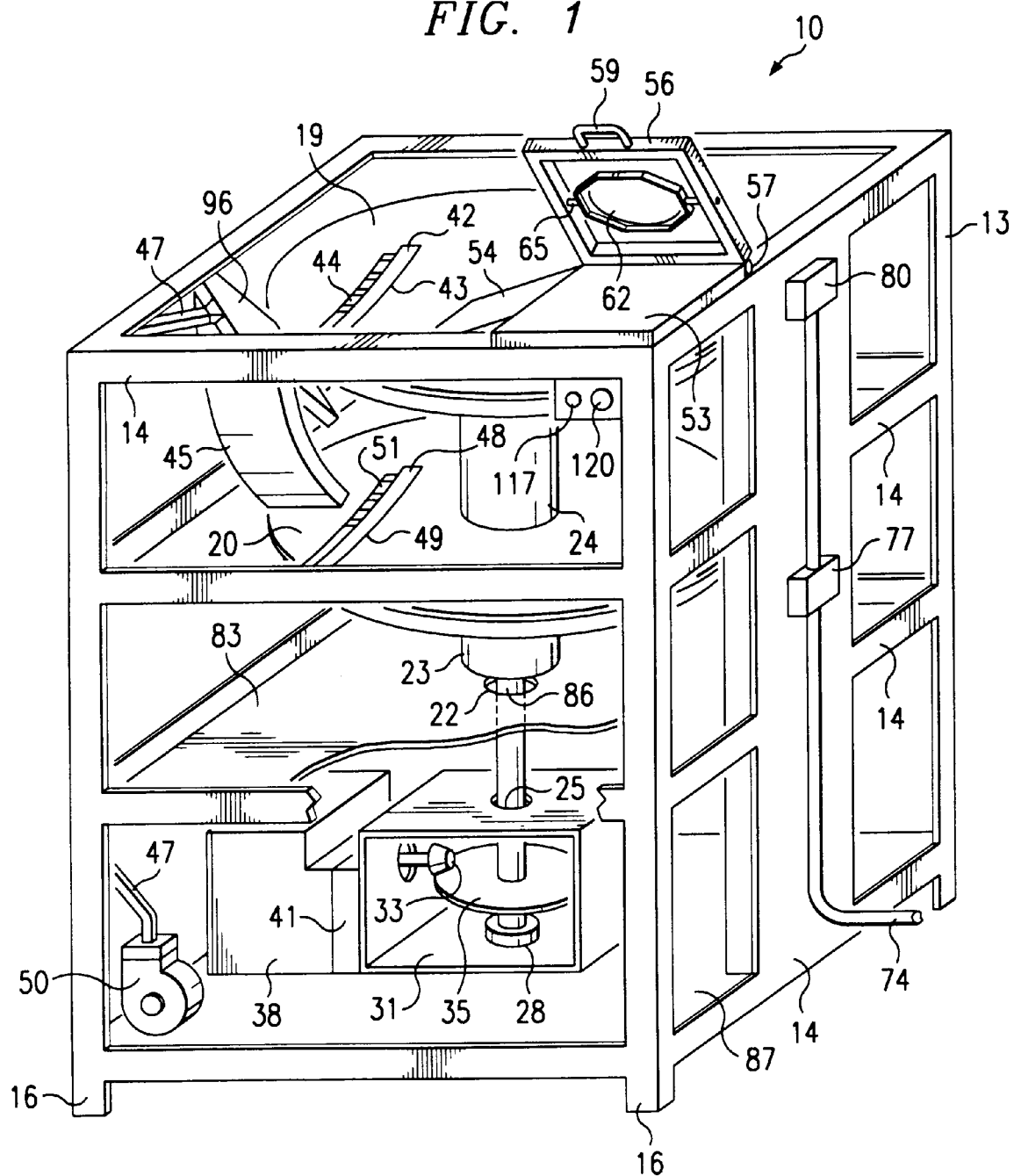
FIG. 1 is a perspective view of a preferred embodiment of the imprinting press for flat bread products, illustrating a combination with the rotating disks for toasting the bakery products.

Referring to FIG. 1, the imprinting press and cooking device 10 are preferably supported by an open frame 13. The frame 13 consists of a rectangular enclosure having protective cross members 14 to add strength and protection for the working components. Frame 13 is supported by adjustable legs 16.

Frame 13 has a bottom deck 87 and a middle deck 83. Bottom deck 87 can be formed by a flat plate welded between the bottom cross members 14. Support box 31 is mounted to deck 87. Support box 31 is a rectangular enclosure mounted in the center of deck 87 to house and protect ring gear 35, right angle gear 33, support bottom bearing 28 and top bearing 25, which will be more fully described below. Bottom bearing 28 and top bearing 25 support center post 22, which in turn supports upper and lower circular cooking plates 19 and 20. Bottom bearing 28 also forms a thrust surface to support the weight of center post 22, ring gear 35 and upper and lower circular cooking plates 19 and 20.

Center post 22 is mounted in bottom bearing 28 and proceeds upward from top bearing 25 through hole 86 in deck 83 and then expands to a larger diameter, forming support post 23. Support post 23 is welded to the bottom of lower circular cooking plate 20, coaxial with lower circular cooking plate 20 and center post 22. Support post 24 is positioned on top of and coaxial with lower circular cooking plate 20 and welded in place. Support post 24, in turn, is coaxially positioned below upper circular cooking plate 19 and welded in place.

The cooking plates 19 and 20 are free to rotate in the top bearing 25 and bottom bearing 28. During operation, they are driven by ring gear 35 which is engaged by right angle drive gear 33. Right angle drive gear 33 is connected to low speed gear box 41, which is in turn driven by a high speed electric motor 38. During operation, motor 38, through gear box 41 right angle drive gear 33 and ring gear 35 turns the cooking plates 19 and 20 at approximately three revolutions per minute. However, this speed can be varied in alternate embodiments to raise or lower the rotational speed of the cooking plates and consequently, the potential output of cooked bread products produced by the machine.

On top of circular cooking plate 19, scraper 42 is radially positioned and held in place by frame 13. Scraper 42 is comprised of an angular bar 43, formed with a slight curve. Angular bar 43 holds flexible scraper 44 downward against upper circular cooking plate 19. Angular scraping bar 43 is rigidly bolted to frame 13. A second scraper 48 including angular bar 49 and flexible scraper 51 is radially positioned on top of lower cooking plate 20. Scraper 48 is rigidly held in place by frame 13.

Air slide 45 is held directly adjacent upper circular cooking plate 19 and scraper 42 by channel duct 46. Channel duct 46 is bolted in place on frame 13 between top cross members 14.

Figure 4:
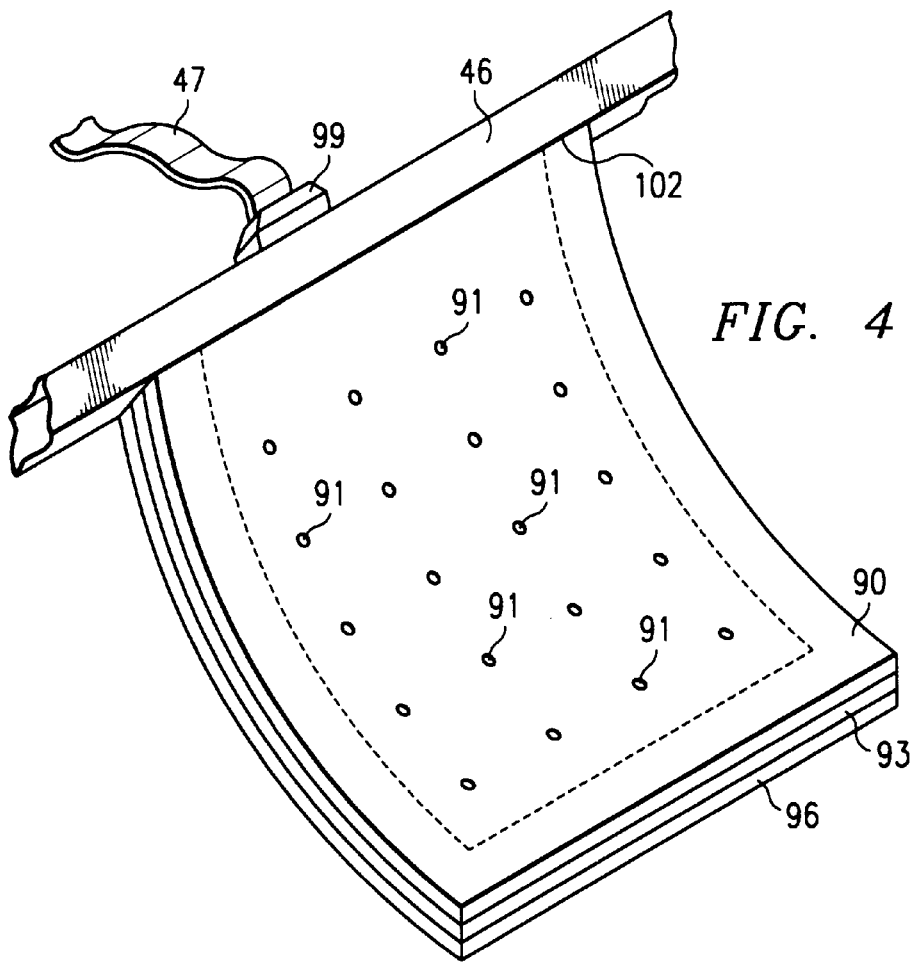
FIG. 4 is a partial perspective view of the air slide and required ducting.

Referring briefly to FIG. 4, it can be seen that air slide 45 is preferably comprised of three pieces of curved stainless steel. Top plate 90 has multiple perforations 91 for the passage of high pressure air. Top plate 90 is spot welded to spacer 93. Spacer 93 is preferably a "U" shaped piece of stainless steel cured to match top plate 90. Bottom plate 96 is cured to match top plate 90 and is also spot welded to spacer 93. The result is a thin flat duct having one open end at the top. Other methods of forming a duct are well known in the art and will serve well here; they will not be disclosed. Channel duct 46 is formed with a thin rectangular hole (not shown) which matches the open end formed between top plate 90 and bottom plate 96. Top plate 90, spacer 93 and bottom plate 96 are all sealed to this thin rectangular hole in channel duct 46. Channel duct 46 also connects to reduction coupling 19 which is, in turn, connected to transmission duct 47. A second hole in channel duct 46 matching that in reduction coupling 99 allows air to flow from transmission duct 47 through reduction coupling 99 into channel duct 46 and in turn, into the space in between top plate 90 and bottom plate 96 and outward through perforations 91. The ends of channel duct 46 are sealed.

Returning to FIG. 1, transmission duct 47 can been seen to be connected to high speed impeller 50. In operation, high speed impeller 50 supplies high pressure air through duct 47 to be expelled through perforations 91. Thus, a tortilla scraped off of the upper cooking plate will slide down the air slide, supported on a thin cushion of pressured air. Other sources of air pressure can be used here as well.

In the top corner of frame 13, a flat press plate 53 is positioned and bolted in place. Flat press plate 53 is hinged to support frame 56. A coil spring 57 is spot welded to support frame 56 and flat press plate 23 to aid in lifting support frame 56, as will be further described below. Support frame 56 is preferably constructed of right angle channel forming an open frame to support imprinting plate 62. Imprinting plate 62 is supported by pins 65 which are pivotally connected to support frame 56. Referring briefly to FIGS. 3a, 3b, 3c and 3d, the details of the imprinting press can be seen.

Figure 3A:
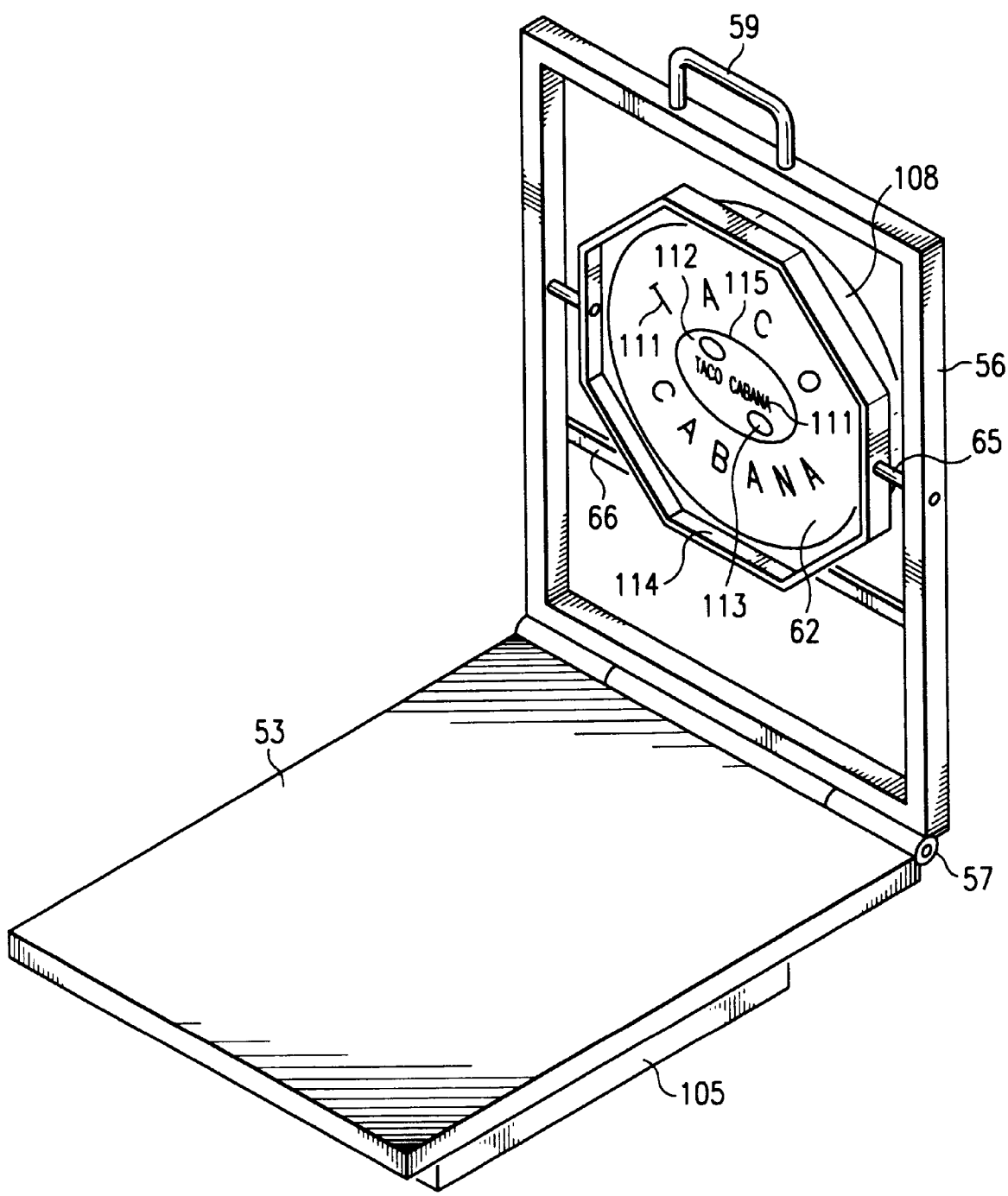
FIG. 3a is a partial front perspective view of a preferred embodiment of the imprinting press for flat bread products, illustrating the press plate, imprinting plate and pivotal support mechanisms.

Referring to FIG. 3a, a handle 59 can be seen bolted to the top of support frame 56. This handle is grasped by the user and pulled downward to press and imprint a tortilla. Both flat press plate 53 and imprinting plate 62 are heated. This heating is accomplished through electrical heating elements 105 and 108 which are bolted in place in direct contact with the back of flat plate 53 and imprinting plate 62. In the preferred embodiment, each heating element is rated at 2000 watts; however, other wattages may be implemented with successful results in other embodiments. Other heat sources, such as gas burners or inductive elements, may also be used with varying degrees of success. Heating elements 108 and 105 are directly connected to a thermostatic control, shown in FIG. 1 at 117. Thermostat 117 is, in turn, connected to a source of electrical power in the preferred embodiment is 220 V a.c. The details of these connections and of thermostatic control are well known in the art and will not be discussed further.

Imprinting plate 62 is preferably shaped in the form of a flat octagon. A circular shape is inscribed in the octagon leaving each corner of the octagon raised. The corners form standoffs 114, which press directly against flat plate 53 when the imprinting press is closed. Standoffs 114 are preferably 0.020" thick. The standoffs form the maximum thickness of the tortilla or other bread product to be pressed by controlling the distance between the imprinting plate 62 and the flat press plate 53 when the imprinting press is enclosed. Other standoff thicknesses can be used, depending on the desired thickness of the flat bread product. Design 111 are shown inscribed into imprinting plate 62. In the preferred embodiment, the design is engraved into imprinting plate 62 to a depth of approximately 0.020". Other depths can be used to vary the results and designs obtained. In other embodiments, design 111 can be embossed onto printing plate 62.

In the preferred embodiment, imprinting plate 62 also includes a removable icon 112. Imprinting plate 62 is formed with a round hole 115 in its center. Icon 112 is a removable plate which is fitted exactly within hole 115 and held in place by flathead screws 113. Additional designs 111 are engraved or embossed into icon 112 and appear on the tortilla surface. The advantage of removable icon 112 is that it can be changed for each restaurant or festive events to custom label the tortillas or other bread products.

Figure 3B:
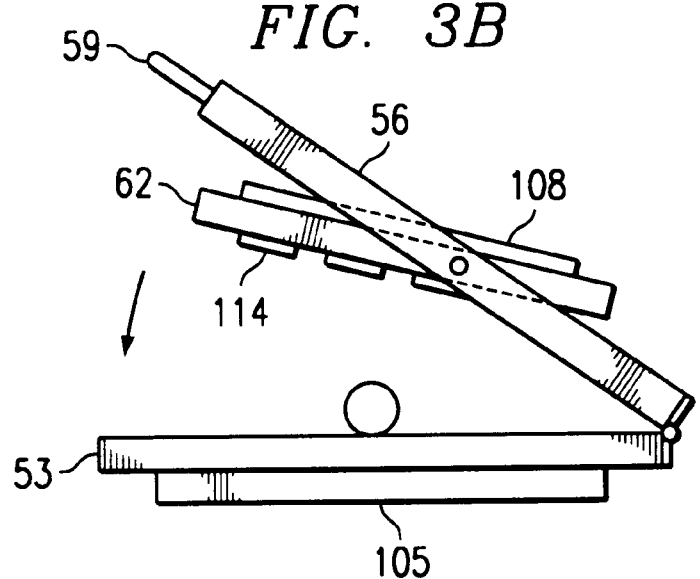
FIG. 3b is a partial side view of the imprinting press in combination with a portion of dough to be pressed shown in a full open position.
Figure 3C:
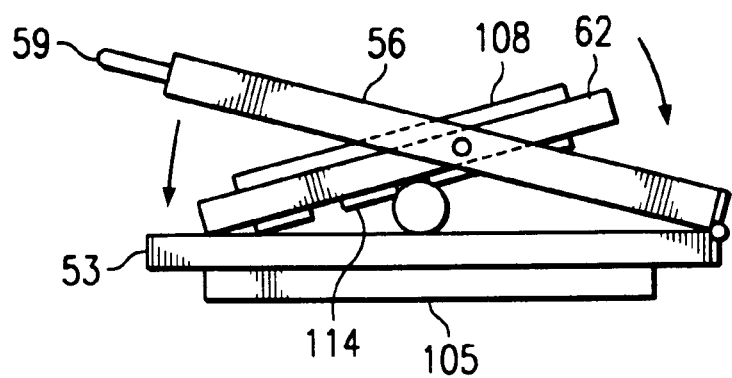
FIG. 3c is a partial side view of the imprinting press in combination with a portion of dough to be pressed shown in partially closed position.
Figure 3D:
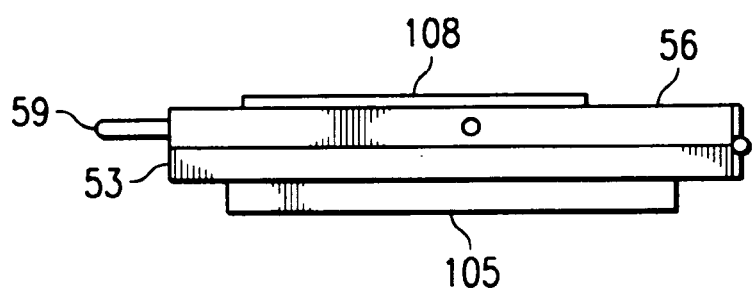
FIG. 3d is a partial side view of the imprinting press in combination with a portion of dough to be pressed shown in fully closed pressing position.

Referring to FIG. 3b, the operation of the imprinting press can be seen. FIG. 3b shows the imprinting press open and the position of imprinting plate 62. Frame 56 is held open by coil spring 57. Imprinting plate 62 is held at an angle by support frame 56 and pins 65. As seen in FIG. 3c, as the imprinting press is closed, the top of imprinting plate 62 contacts flat press plate 53 first. As the imprinting press is further closed, the imprinting plate 62 rotates downward toward flat press plate 53 pivoting and sliding at its front corner down toward the unpressed dough product. When fully closed, the imprinting press comes to rest as shown in FIG. 3d. The advantage of the pivotal connection of imprinting plate 62 to support frame 56 is that as the imprinting press is being closed, the tortilla dough is pressed evenly from front to back forming a nearly perfect disk shape. When pressure is released from handle 59, coil spring 57 returns frame 56 to its open position. Slide plate 54 is connected to press plate 53 and aids in sliding pressed bread products from flat press plate 53 onto upper cooking plate 19.

Figure 2:
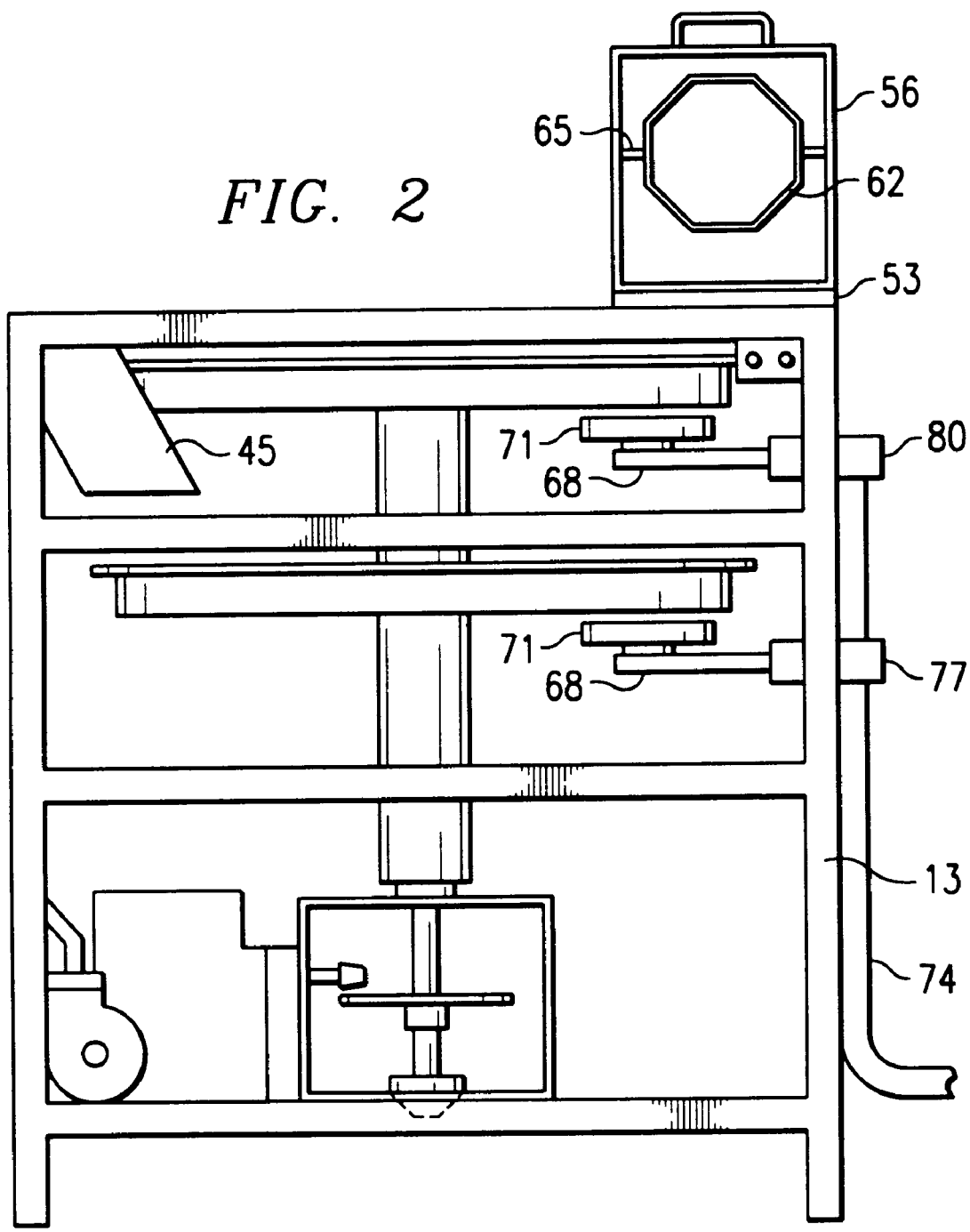
FIG. 2 is a side view of a preferred embodiment of the imprinting press for flat bread products, illustrating a combination with the rotating disks for toasting the flat bread products.

As shown in FIG. 1, upper circular cooking plate 19 and lower circular cooking plate 20 are heated. In the preferred embodiment, the cooking plates are heated through gas burners which can best be seen in FIG. 2. FIG. 2 shows support piping 68 which is connected to the exterior frame 13. Support piping 68 extends inward underneath cooking plates 19 and 20. The support piping terminates in a round burner 71 under each cooking plate. Gas valves 80 are provided. In the preferred embodiment, these are electrically controlled solenoid valves which are operated from a stop switch shown in FIG. 1. Stop switch 120 also controls the operation of impeller 50 and motor 38. In operation, when the stop switch is turned on, gas supply is allowed to flow to burner 71 and motor 38 is activated as is impeller 50. When the stop switch is turned off, impeller 50 and motor 38 are both turned off and gas valves 77 and 80 are closed, stopping the flow of gas to burners 71. The electrical connections between the valves, motor, impeller and stop switch are well known and will not be further described.

In operation, the cooking unit is turned on via stop switch 120 and the imprinting press is set to a desired temperature through thermostat 117. After being allowed to warm up a short period of time, a ball of tortilla dough is place roughly in the center of flat press plate 53. Handle 59 on support frame 56 is grasped and pulled downward bringing imprinting plate 62 toward flat press plate 53. As the imprinting plate is closed, the tortilla dough is pressed out into a circular disk to a thickness set by standoff 114. As it is being pressed, the tortilla dough flows upward into engraved design 111 forming an embossed label on the flat tortilla. Since both the imprinting plate 62 and the flat press plate 53 are heated, the tortilla dough does not stick to them.

After pressing, the imprinting plate is raised via handle 59 and coil spring 57 revealing the pressed tortilla. The pressed tortilla is then slid down slide plate 54, either manually, or by the force of gravity, and onto upper circular cooking plate 19. Upper circular cooking plate 19 is rotating and the pressed tortilla rotates and cooks, around the outer periphery of the cooking plate. When the tortilla reaches scraper 42, it contacts the tortilla and forces it off of cooking plate 19 and onto air slide 45. Air slide 45 then directs the tortilla downward toward lower cooking plate 20. The tortilla then cooks on its opposite on lower cooking plate 20 rotating a full revolution toward scraper 48. After cooking, the imprinted design is fixed in the tortilla. Scraper 48 then forces the now cooked tortilla of cooking plate 20 where it falls and comes to rest on deck 83. It can then be removed and used in food preparation.

Figure 5:
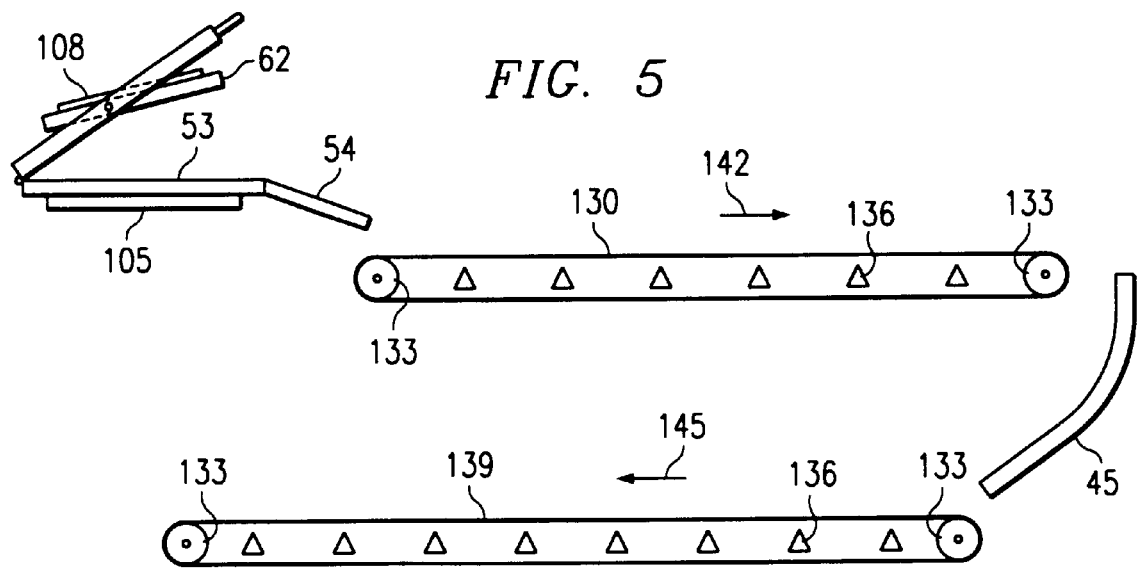
FIG. 5 is a schematic view of an alternative embodiment comprising a belt driven conveyor system.

FIG. 5 shows a schematic diagram of a second embodiment of the device. In this embodiment, the circular cooking plates 19 and 20 are replaced by flat belts 130 and 139. The belts are supported by pulleys 133 and positioned one above the other as shown. The direction of travel of each belt in this alternate embodiment is shown as 142 and 145. Heating elements 136 are provided under the top surfaces of belts 130 and 139 to complete cooking of the tortilla. Radiative, convective, conductive or inductive heating elements may all be used in alternate embodiments. The mechanical elements necessary to support the belts, and cause pulleys 133 to rotate, therefore moving belts is well know in the art and will not be described here. Air slide 45 is also provided at the end of belt 130 to aid in moving and flipping the flat bread product from belt 130 to belt 139.

In operation of this embodiment, the tortilla is pressed by forcing imprinting plate 62 downward against flat press plate 53. After pressing and imprinting the tortilla, imprinting plate 62 is raised and the now pressed tortilla is slid down slide plate 54 and onto moving belt 130. Heating elements 136 provide heat to cook the first side of the tortilla as it travels along belt 130. When reaching the end of belt 130, the tortilla falls off and is flipped by air slide 45 downward and onto belt 139. Heating elements 136 complete cooking of the second side of the tortilla as it travels the length of belt 139. At the end of belt 139, the tortilla has completed cooking whereupon it is ready to be used in food preparation.

The previous discussion discloses the most marketable embodiments of the present invention. However, there are alternative ways of accomplishing similar results. For example, the imprinting plate has been described as pressing a form into the uncooked dough. But, a surface image could be seared onto the dough with a flat imprinting plate if heating elements on the opposite side of the plate were formed in the shape of the image. In other words, the surface temperature of the imprinting plate would be higher immediately opposite the heating elements. Thus, these higher temperature zones could be formed to match the name of a restaurant. When the plates were brought together, the tortilla dough would be flattened and partially seared, spelling out the name of that restaurant. The partially cooked tortilla would still be removed and then fully cooked. Thus, the term imprinting should be interpreted to include branding such as described in this alternative.

In another embodiment, the tortilla could be fully cooked before having the image or word seared onto its surface. Up to this point, the imprinting was done before the tortilla was cooked. Conceivably, an imprinting station could be placed at the end of the process.

While the preferred embodiment of the invention has been described, it is not intended to limit the invention to the particular form set forth, but is intended to cover such alternatives, modifications, and equivalents as may be included in the spirit and scope of the invention as defined by the appended claims.

I claim:

1. A device for pressing, imprinting and cooking a dough product comprising:
   a. an imprinting station to press and imprint the dough product, the imprinting station comprising a lower generally upwardly facing pressing plate having a substantially smooth uninterrupted pressing surface formed thereon and an upper, generally downwardly facing embossing plate having an embossing surface formed thereon, said plates being cooperable to press and emboss a dough product therebetween, said embossing plate being retractable away from said pressing plate to allow for movement of the dough product, after pressing, off of said pressing surface by sliding said dough product along said pressing surface;
   b. a conveyor, adjacent the imprinting station to receive and move the dough product which has been moved off of said pressing surface; and
   c. a heat source adjacent said conveyor to cook the dough product.

2. A device as recited in claim 1 wherein the conveyor comprises at least one rotating plate.

3. A device as recited in claim 1 wherein the conveyor comprises:
   a. a first rotating plate;
   b. a second rotating plate adjacent the first rotating plate;
   c. a slide means, adjacent the first rotating plate, for transferring the dough product from the first rotating plate to the second rotating plate.

4. A device as recited in claim 1 wherein the embossing surface is engraved with the design to be imprinted on the dough product.

5. A device as recited in claim 1 wherein the embossing surface has a cameo design to be imprinted into the dough product.

6. A device as recited in claim 1 wherein the embossing surface is pivotally connected to the pressing plate.

7. A device as recited in claim 1 wherein the embossing surface and the pressing surface are adjacent a further heat source.

8. A device as recited in claim 1 wherein the embossing surface further comprises a removable embossing icon bearing the design to be imprinted on the dough product.

9. A device as recited in claim 1 wherein the embossing surface further comprises thickness control means, attached to the embossing surface, for controlling the thickness of the pressed dough product.

10. A device for pressing, imprinting and cooking a dough product comprising:
    a. an imprinting station to press and imprint the dough product, the imprinting station having an embossing surface and a pressing surface;
    b. a first conveyor adjacent the imprinting station to move the dough product and a second conveyor for receiving the dough product from the first conveyor;
    c. a heat source adjacent at least one of the conveyors to cook the dough product; and
    d. a slide means adjacent the first conveyor for transferring the dough product from the first conveyor to the second conveyor including an air pressure source,
    a perforated plate adjacent the first, and
    a conduit means connecting the air pressure source and the perforated plate.

11. A device as recited in claim 10 wherein at least one of said conveyors comprises a moving belt.

12. A device as recited in claim 10 wherein the first and second conveyors comprise:
    a. a first moving belt; and
    b. a second moving belt, respectively; and
    c. said slide means is disposed adjacent the first moving belt, for transferring the dough product from the first moving belt to the second moving belt.

13. An apparatus for pressing, branding and cooking a flat bread product comprising:
    a. a heated branding plate;
    b. a frame pivotally supporting the branding plate;
    c. a heated press platen;
    d. a hinge connecting the frame to the press platen;
    e. at least two rotating grill plates adjacent the press platen;
    f. a slide, adjacent the first rotating grill plate, to direct the flat bread product from the first rotating grill plate to the second rotating grill plate, the slide forming a duct to force the air pressure toward the flat bread product; and
    g. a source of air pressure connected to the slide.

14. The apparatus of claim 13, wherein the frame further comprises:
    a. a box having an opening larger than the branding plate; and
    b. two opposing coaxial support pins, pivotally connecting the branding plate to the frame, the axis of the support pins being generally parallel to the hinge.

15. An apparatus for pressing, branding and cooking a flat bread product comprising:
    a. a heated branding plate;
    b. a frame pivotally supporting the branding plate;
    c. a heated press platen;
    d. a hinge connecting the frame to the press platen;
    e. at least two rotating grill plates adjacent the press platen;
    f. a source of air pressure; and
    g. a slide, adjacent the first rotating grill plate and connected to the source of air pressure, to direct the flat bread product from the first rotating grill plate to the second rotating grill plate.

16. The apparatus of claim 15, wherein the frame further comprises:
    a. a box having an opening larger than the branding plate; and
    b. two opposing coaxial support pins, pivotally connecting the branding plate to the frame, the axis of the support pins being generally parallel to the hinge.

17. In a flat bread pressing and cooking apparatus including a dough pressing means, a moving cooking surface and a transfer means to transfer the bread off of the cooking surface, an improved transfer means comprising:
    a. a generally smooth slide surface having holes therein;
    b. a source of air pressure; and
    c. a duct to direct the air pressure to and out of the holes.

* * * * *